Oct. 4, 1938.　　J. F. LESCALLEET　　2,132,305
AUTOMOBILE SEAT HOLDER
Filed July 14, 1937　　2 Sheets-Sheet 1

Inventor
John F. Lescalleet,

By Clarence A. O'Brien
Hyman Berman
Attorneys

Oct. 4, 1938. J. F. LESCALLEET 2,132,305
AUTOMOBILE SEAT HOLDER
Filed July 14, 1937 2 Sheets-Sheet 2
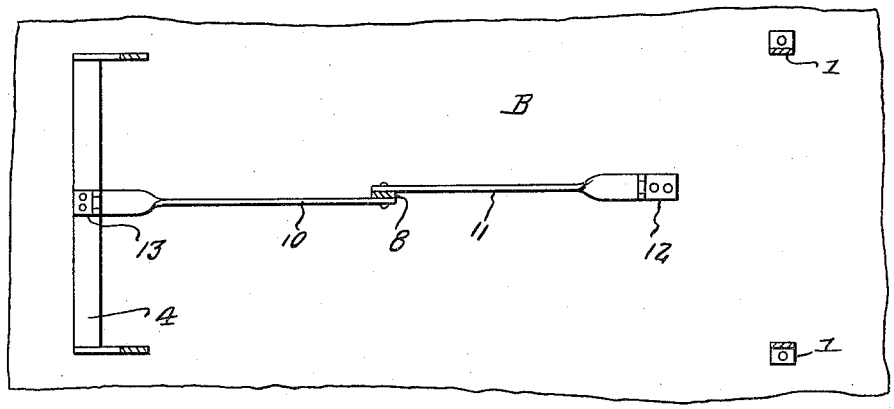
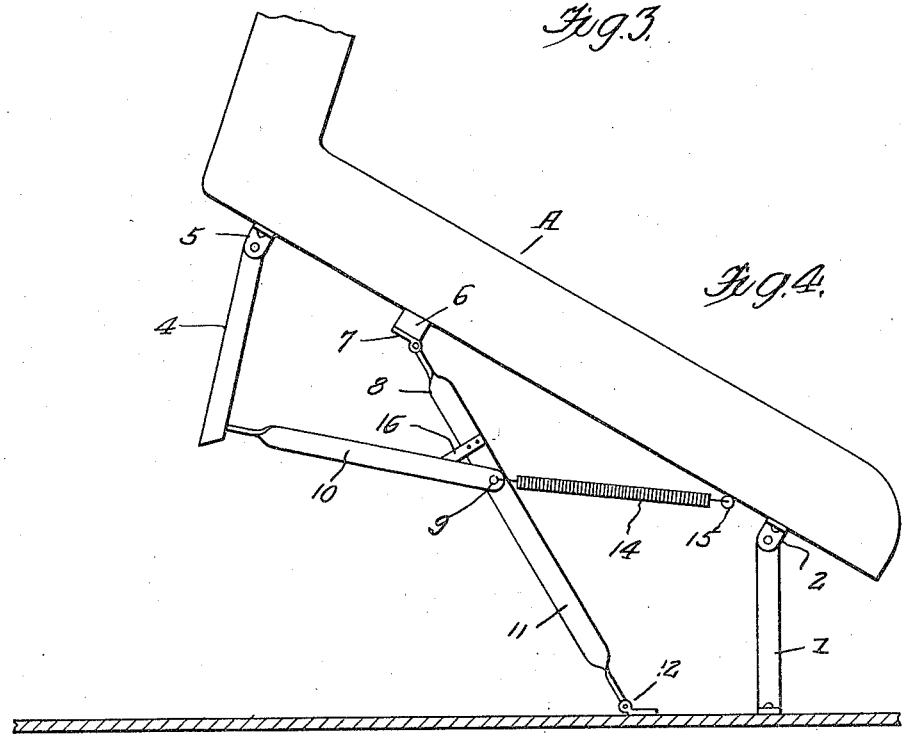
Inventor
John F. Lescalleet,
By Clarence A. O'Brien
Hyman Berman
Attorneys Patented Oct. 4, 1938

2,132,305

UNITED STATES PATENT OFFICE 2,132,305

AUTOMOBILE SEAT HOLDER

John Frantz Lescalleet, Lancaster, Ohio

Application July 14, 1937, Serial No. 153,634

2 Claims. (Cl. 155—5)

This invention relates to a seat holder which is mainly designed for use on a front seat of the coach type of automobile, the general object of the invention being to provide means for holding the seat in raised position with the rear seat rest pulled forwardly so that one can readily enter the rear part of the automobile or leave said part without interference from the seat and its rest, the invention also facilitating placing of articles in the rear part of the automobile or removing them therefrom.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 3 is a section on the line 3—3 of Figure 1.

Figure 4 is a side view, similar to Figure 1, but showing the seat in raised position.

Figure 1:
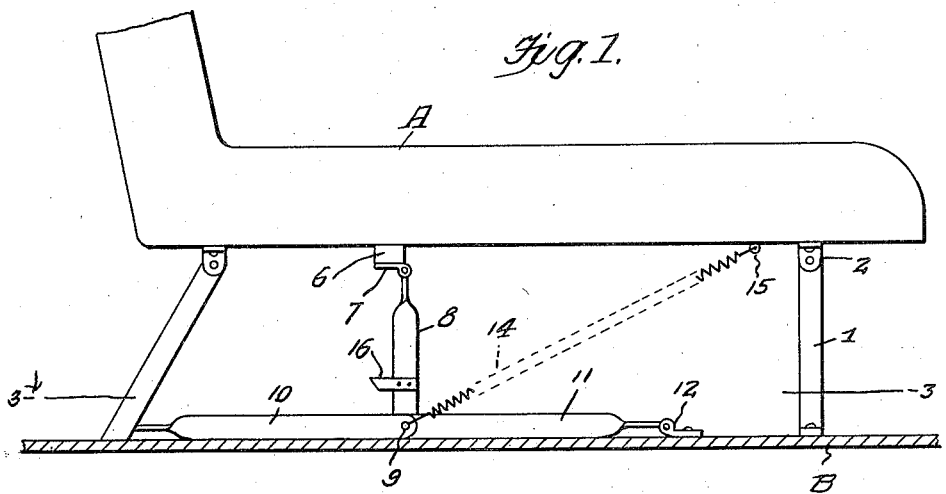
Figure 1 is a side view of a portion of a seat of an automobile, showing the invention applied thereto, the floor of the automobile being shown in section.
Figure 2:
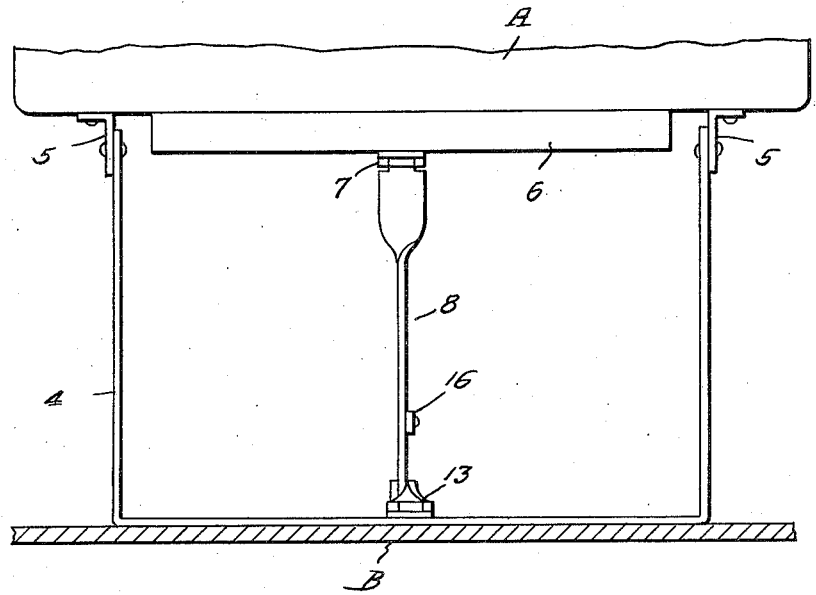
Figure 2 is a rear view of Figure 1.

In these drawings the letter A indicates the seat which is supported at its front by the legs 1 which are fastened to the floor B and are pivoted at their upper ends to the brackets 2 attached to the bottom of the seat. A U-shaped leg 4 has the ends of its limbs pivoted to the brackets 5 attached to the rear of the seat and in carrying out my invention I attach a cross piece 6 to the bottom of the seat an appreciable distance in front of the brackets 5 and fasten a hinge leaf 7 to the center thereof. A bar 8 has its upper end pivoted to this leaf 7 and its lower end is connected by a pivot bolt 9 to the ends of a rear bar 10 and a front bar 11, the other end of the front bar 11 being hingedly connected to the floor as shown at 12 and the other end of the bar 10 being hingedly connected to the central part of the bight of the leg 4, as shown at 13. As will be seen the adjacent ends of the bars 8, 10 and 11 overlap and the one bolt 9 pivots the three ends together. One end of a spring 14 is connected to the bolt and its other end to a connection 15 on the bottom of the seat adjacent the front thereof. A stop 16 having a beveled end extends rearwardly from the bar 8 and is positioned to engage the bar 10 when the parts are in raised position, as shown in Figure 4.

When the seat is raised the bar 8 pulls upwardly the bars 10 and 11 and the bar 10 pulls forwardly the leg 4 at the rear of the seat and the spring 14 pulls the bars slightly forward of a straight end line position so that the seat will not fall back to its original position but will remain in lifted position, as shown in Figure 4. The stop 16 engaging the bar 10 will act to limit the forward movement of the bars 8 and 11, thus holding the seat in the proper position.

As before stated the raising of the seat and the moving forward of the rear leg enables persons to readily pass by the seat in leaving and entering the automobile and in putting bundles or the like in the automobile or removing them therefrom and as the seat remains in raised position the hands are left free as they are not needed to hold the seat in raised position.

It is thought from the foregoing decription that the advantages and novel features of the invention will be readily apparent.

It is to be understood that changes may be made in the construction and in the combination and arrangement of the several parts, provided that such changes fall within the scope of the appended claims.

Having described the invention what is claimed as new is:—

1. The combination of a vehicle seat pivotally mounted adjacent the front end thereof, a rear leg pivoted thereto, a bar hinged to an intermediate part of the bottom of the seat, a rear bar pivoted to the rear leg, a front bar extending forwardly from the rear bar, the free ends of all of said bars being pivoted together, a spring connected to the pivotal point and the front part of the seat, and a stop for limiting the forward movement of the bars when the seat is lifted.

2. The combination with a vehicle seat pivotally mounted adjacent the front end thereof, a rear leg pivoted thereto, a vertical bar hinged to an intermediate part of the bottom of the seat, a complemental bar extending forwardly from said vertical bar a front bar pivoted to the rear leg, the free ends of all of said bars being pivoted together, and means including a spring connected to the pivotal point and the front part of the seat for holding said seat in tilted position, and adapted to swing said leg forwardly when the seat is raised.

JOHN F. LESCALLEET.